United States Patent
Faigin et al.

(10) Patent No.: US 12,346,982 B2
(45) Date of Patent: Jul. 1, 2025

(54) DYNAMIC VENDING SYSTEM AND METHOD

(71) Applicant: Little Caesar Enterprises, Inc., Detroit, MI (US)

(72) Inventors: Keith Faigin, Detroit, MI (US); R. William Kneifel, II, West Bloomfield, MI (US); Kent A. Deemter, Hudsonville, MI (US); Stuart De Geus, Detroit, MI (US); Rick Moreno, Detroit, MI (US); David Scrivano, South Lyon, MI (US); Jaime Pescia, Detroit, MI (US); Christopher P. Ilitch, Bloomfield Hills, MI (US)

(73) Assignee: Little Caesar Enterprises, Inc., Detroit, MI (US)

( * ) Notice: Subject to any disclaimer, the term of this patent is extended or adjusted under 35 U.S.C. 154(b) by 0 days.

(21) Appl. No.: 18/499,893

(22) Filed: Nov. 1, 2023

(65) Prior Publication Data
US 2024/0144402 A1    May 2, 2024

Related U.S. Application Data

(63) Continuation of application No. 16/644,884, filed as application No. PCT/US2018/049549 on Sep. 5, 2018, now Pat. No. 11,842,414.
(Continued)

(51) Int. Cl.
*G06Q 50/12* (2012.01)
*B60P 3/025* (2006.01)
(Continued)

(52) U.S. Cl.
CPC ............ *G06Q 50/12* (2013.01); *B60P 3/0255* (2013.01); *B60P 3/0257* (2013.01);
(Continued)

(58) Field of Classification Search
CPC ............ G06Q 50/12; G06Q 10/06315; G06Q 10/087; G06Q 10/0832; G06Q 30/0201;
(Continued)

(56) References Cited

U.S. PATENT DOCUMENTS

| 1,522,932 A | 1/1925 | Zsoldos |
| 4,894,717 A | 1/1990 | Komei |

(Continued)

FOREIGN PATENT DOCUMENTS

| WO | 1999010794 A2 | 3/1999 |
| WO | 2002023427 A2 | 3/2002 |
| WO | 2015034868 A1 | 3/2015 |

OTHER PUBLICATIONS

International Search Report dated Nov. 5, 2018, relating to International Application No. PCT/US2018/049549.
(Continued)

*Primary Examiner* — Michael Collins
(74) *Attorney, Agent, or Firm* — Honigman, LLP

(57) ABSTRACT

A dynamic vending system includes a vending manager and a delivery vehicle. The vending manager is configured to receive and evaluate a plurality of dynamic conditions from the delivery vehicle and to provide instructions including a planned route to the delivery vehicle based on the dynamic conditions. The delivery vehicle includes a plurality of products available for sale, and is configured to execute the instructions including the planned route. The delivery vehicle is further configured to receive requests from consumers to stop along the planned route and to execute a transaction with the consumer for one of the products available for sale. The transaction includes the selection of one of the products available for sale, receipt of payment for the product, and dispensing the selected product to the consumer.

16 Claims, 15 Drawing Sheets

Related U.S. Application Data

(60) Provisional application No. 62/554,899, filed on Sep. 6, 2017.

(51) Int. Cl.
*B60W 60/00* (2020.01)
*G06Q 10/0631* (2023.01)
*G06Q 10/08* (2024.01)
*G06Q 10/0832* (2023.01)
*G06Q 10/087* (2023.01)
*G06Q 30/0201* (2023.01)
*G06Q 50/40* (2024.01)
*G07F 17/00* (2006.01)

(52) U.S. Cl.
CPC . *B60W 60/00256* (2020.02); *G06Q 10/06315* (2013.01); *G06Q 10/08* (2013.01); *G06Q 10/0832* (2013.01); *G06Q 10/087* (2013.01); *G06Q 30/0201* (2013.01); *G06Q 50/40* (2024.01); *G07F 17/0064* (2013.01)

(58) Field of Classification Search
CPC .... G06Q 50/28; G06Q 50/30; G07F 17/0064; B60W 60/00256; B60P 3/0255; B60P 3/0257

See application file for complete search history.

(56) References Cited

U.S. PATENT DOCUMENTS

| | | | |
|---|---|---|---|
| 5,579,952 | A | 12/1996 | Fiedler et al. |
| 5,671,362 | A | 9/1997 | Cowe et al. |
| 6,026,372 | A | 2/2000 | Savage |
| 6,327,576 | B1 | 12/2001 | Ogasawara |
| 7,137,529 | B2 | 11/2006 | Martinelli et al. |
| 7,232,062 | B1 | 6/2007 | Salerno |
| 7,418,311 | B1 | 8/2008 | Lagassey et al. |
| 7,951,409 | B2 | 5/2011 | Parker |
| 9,064,227 | B2 | 6/2015 | Scrivano et al. |
| 10,275,975 | B2 * | 4/2019 | High .................. G01C 21/3605 |
| 10,339,514 | B2 | 7/2019 | Natarajan et al. |
| 10,482,525 | B2 | 11/2019 | Mueller et al. |
| 10,515,505 | B2 * | 12/2019 | High ........................ G07F 9/001 |
| 10,654,394 | B2 | 5/2020 | Goldberg et al. |
| 10,885,492 | B2 | 1/2021 | Goldberg et al. |
| 10,902,371 | B2 | 1/2021 | Goldberg et al. |
| 11,132,860 | B1 | 9/2021 | Lecocke et al. |
| 11,144,870 | B2 | 10/2021 | Loubriel |
| 11,842,414 | B2 * | 12/2023 | Faigin .................. G01C 21/362 |
| 2002/0035515 | A1 | 3/2002 | Moreno |
| 2005/0021407 | A1 | 1/2005 | Kargman |
| 2005/0205081 | A1 | 9/2005 | Barker et al. |
| 2006/0235755 | A1 | 10/2006 | Mueller et al. |
| 2007/0125100 | A1 | 6/2007 | Shoenfeld |
| 2007/0214053 | A1 | 9/2007 | Salerno |
| 2007/0251521 | A1 | 11/2007 | Schackmuth et al. |
| 2011/0252813 | A1 | 10/2011 | Veltrop |
| 2012/0086314 | A1 | 4/2012 | Bourke et al. |
| 2013/0297463 | A1 | 11/2013 | Garber |
| 2014/0081445 | A1 | 3/2014 | Villamar |
| 2014/0083309 | A1 | 3/2014 | Reese et al. |
| 2015/0006005 | A1 * | 1/2015 | Yu .......................... G05D 1/667 701/22 |
| 2015/0309516 | A1 | 10/2015 | Williams et al. |
| 2015/0356501 | A1 | 12/2015 | Gorjestani et al. |
| 2017/0011580 | A1 * | 1/2017 | Huang ............... G06Q 30/0631 |
| 2017/0083862 | A1 | 3/2017 | Loubriel |
| 2017/0124547 | A1 | 5/2017 | Natarajan et al. |
| 2017/0255900 | A1 * | 9/2017 | High .................... G06Q 10/087 |
| 2018/0053369 | A1 * | 2/2018 | High ..................... G07F 9/0235 |
| 2019/0047515 | A1 | 2/2019 | Ferguson et al. |
| 2019/0051083 | A1 | 2/2019 | Goldberg et al. |

OTHER PUBLICATIONS

Non-Final Office Action dated Nov. 26, 2019, relating to U.S. Appl. No. 16/597,731.
Final Office Action dated Mar. 18, 2020, relating to U.S. Appl. No. 16/597,731.
Advisory Action dated Apr. 21, 2020, relating to U.S. Appl. No. 16/597,731.
Non-Final Office Action dated Feb. 25, 2020, relating to U.S. Appl. No. 16/5552,899.
Final Office Action dated Jun. 16, 2020, relating to U.S. Appl. No. 16/5552,899.
Advisory Action dated Sep. 2, 2020, relating to U.S. Appl. No. 16/5552,899.
Non-Final Office Action dated Sep. 22, 2020, relating to U.S. Appl. No. 16/5552,899.
Ramanathan, "Stocking and Discounting Decisions for Perishable Commodities Using Expected Profit Approach", 2006.
Non-Final Office Action dated Jul. 8, 2011, relating to U.S. Appl. No. 12/765,067.
Final Office Action dated Nov. 4, 2011, relating to U.S. Appl. No. 12/765,067.
Advisory Action dated Apr. 25, 2012, relating to U.S. Appl. No. 12/765,067.
Non-Final Office Action dated Nov. 28, 2017, relating to U.S. Appl. No. 14/745,009.
Non-Final Office Action dated Aug. 13, 2018, relating to U.S. Appl. No. 14/745,009.
Canadian Office Action dated May 19, 2015, relating to Canada Application No. 2759209.
Canadian Office Action dated Jan. 13, 2016, relating to Canada Application No. 2759209.
Canadian Office Action dated Oct. 20, 2016, relating to Canada Application No. 2759209.
Mexican Office Action dated Jul. 19, 2013, relating to Mexico Application No. MX/a/2011/011172.
Mexican Office Action dated May 12, 2014, relating to Mexico Application No. MX/a/2011/011172.
Mexican Office Action dated Dec. 26, 2014, relating to Mexico Application No. MX/a/2011/011172.
Mexican Office Action dated Sep. 2, 2015, relating to Mexico Application No. MX/a/2011/011172.
Canadian Office Action dated Jul. 22, 2016, relating to Canada Application No. 2892492.
Canadian Office Action dated Jun. 20, 2017, relating to Canada Application No. 2892492.
Canadian Office Action dated May 11, 2018, relating to Canada Application No. 2892492.
Canadian Office Action dated Apr. 3, 2019, relating to Canada Application No. 2892492.
Canadian Office Action dated May 5, 2020, relating to Canada Application No. 2892492.
Extended European Search Report dated Jan. 25, 2021, relating to EP Application No. 18854198.1.
European Patent Office, Office Action for Application No. 18854198.1 dated May 20, 2022.
China Patent Office, Office Action for Application No. 201880066125.0 dated Feb. 27, 2023.
Mexican Patent Office, Office Action for Application MX/a/2020/002567dated Aug. 1, 2023.
China Patent Office, 2nd Office Action for Application No. 201880066125.0 dated Sep. 7, 2023.
USPTO, Office Action for U.S. Appl. No. 16/644,844 dated Jan. 31, 2023.
USPTO, Notice of Allowance for U.S. Appl. No. 16/644,884 dated Aug. 2, 2023.
China Patent Office, 2nd Office Action for Application 201880066125.0 dated Sep. 7, 2023.

(56) References Cited

OTHER PUBLICATIONS

China Patent Office, Rejection Decision for Application 201880066125.0 dated Jan. 30, 2024.
Mexican Patent Office, 2nd Office Action for Application MX/a/2020/002567 dated Jan. 4, 2024.
Mexican Patent Office, 3rd Office Action for Application MX/a/2020/002567 dated Apr. 9, 2024.
EPO, Office Action for Application No. 18854198.1 dated Dec. 5, 2024.

* cited by examiner

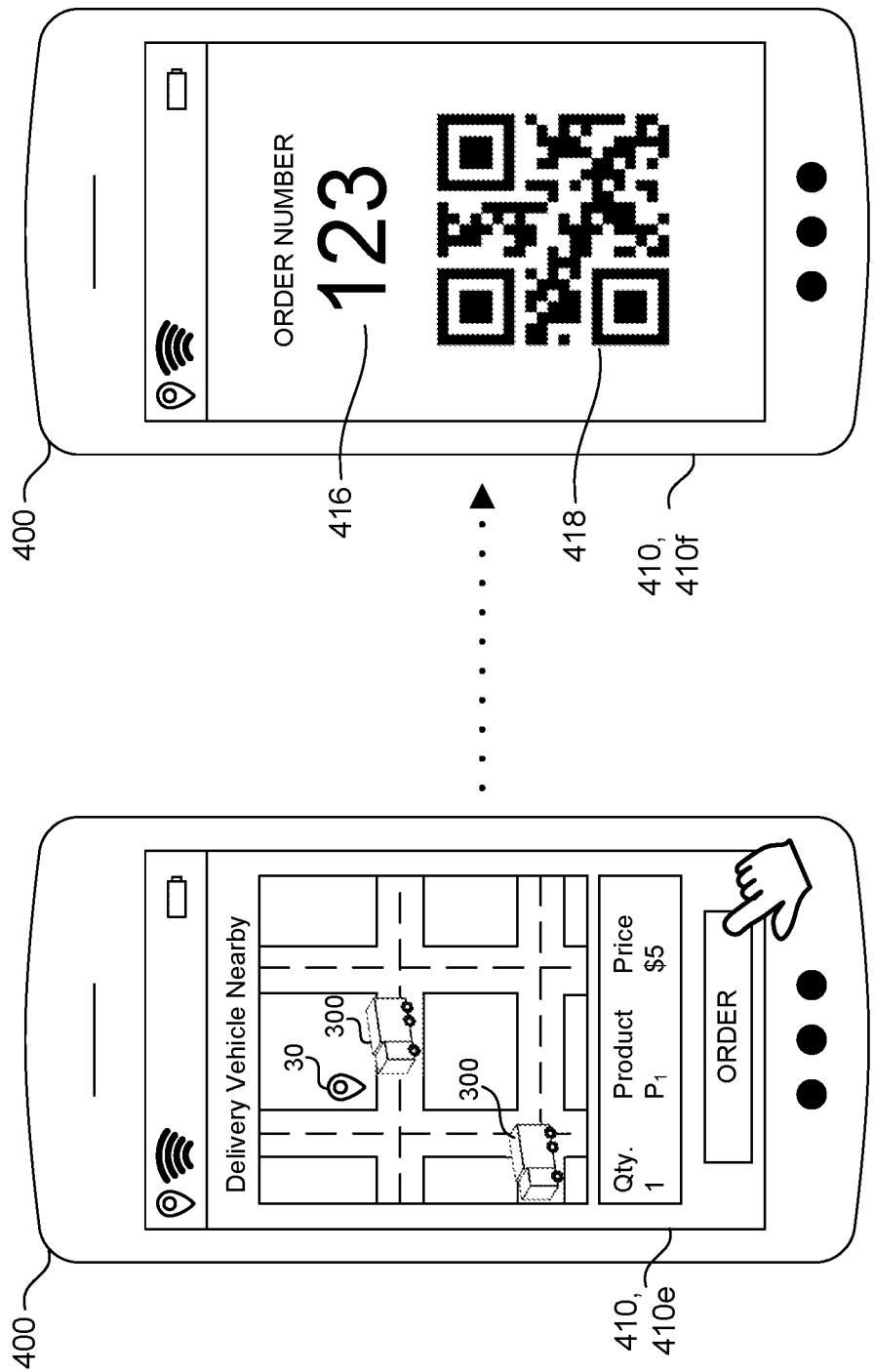

DYNAMIC VENDING SYSTEM AND METHOD

TECHNICAL FIELD

This disclosure relates to a mobile vending system and method, and particularly, to an autonomous mobile vending system and method for prepared food available for sale.

BACKGROUND

Product delivery vehicles are generally configured to deliver an already-purchased product to a predetermined location. For example, a consumer may complete a purchase of a product from a fixed location, such as a restaurant, by phone or internet. The fixed location then provides the purchased product to a delivery vehicle for delivery to a known location of the consumer. The delivery vehicle may be provided with a plurality of the purchased products to be provided a plurality of consumers at various locations. Accordingly, the delivery vehicle may be driven along a fixed route to each of the consumer locations in order to deliver the purchased goods. Although suitable for its intended purpose, delivery vehicles carrying only purchased products lack the ability to engage and transact with consumers which may be along the fixed route, thereby bypassing potential sales.

SUMMARY

A dynamic vending system includes a vending manager and a delivery vehicle. The vending manager is configured to receive and evaluate a plurality of dynamic conditions from the delivery vehicle and to provide instructions including a planned route to the delivery vehicle based on the dynamic conditions. The delivery vehicle includes a plurality of products available for sale, and is configured to execute the instructions including the planned route. The delivery vehicle is further configured to receive requests from consumers to stop along the planned route or to deviate from the planned route, and to execute a transaction with the consumer for one of the products available for sale. The transaction includes the selection of one of the products available for sale, receipt of a payment for the product, and dispensing the selected product to the consumer.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2G are schematic views of an example of an implementation of a dynamic vending system environment.

Like reference symbols in the various drawings indicate like elements.

DETAILED DESCRIPTION

Figure 1A:
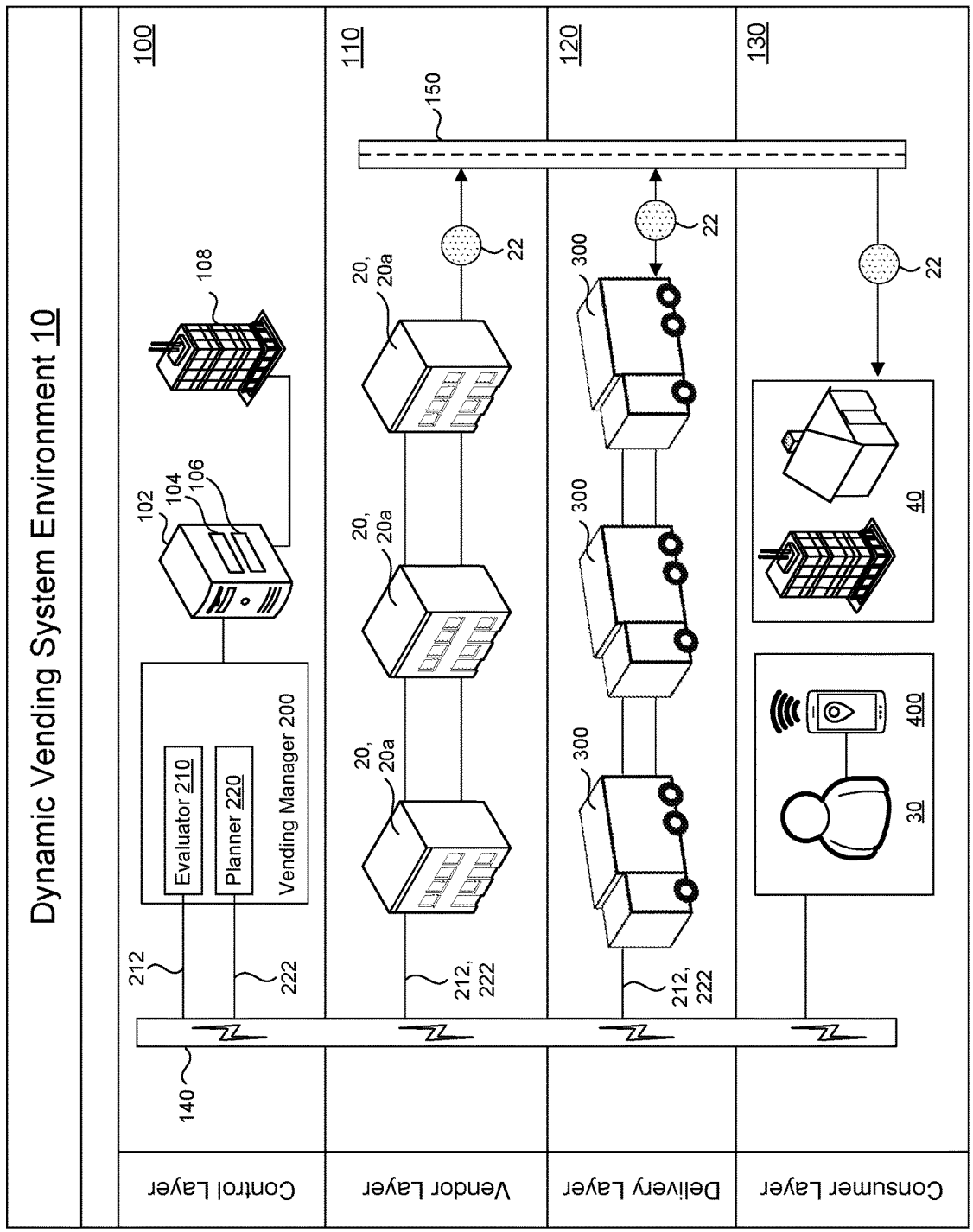
FIG. 1A is a schematic view of an example of a dynamic vending system environment.

FIG. 1A is an example of a dynamic vending system (DVS) environment 10 according to the instant disclosure. The DVS environment 10 may include several layers for facilitating the sale and delivery of products from a vendor 20 to a consumer 30. FIG. 1A attempts to simplify the product vending process into four layers: a control layer 100, a vendor layer 110, a delivery layer 120, and a consumer layer 130. Each of the layers 100, 110, 120, 130 is in communication with each of the other layers 100, 110, 120, 130 via a communications network 140. Additionally, the vendor layer 110, the delivery layer 120, and the consumer layer 130 may be interconnected by a distribution network 150, such as a highway system.

The control layer 100 includes a vending manager 200 configured to run on a server 102 having data processing hardware 104 and memory hardware 106. The vending manager 200 includes an evaluator 210 and a planner 220. As detailed in FIG. 1B and described below, the evaluator 210 is configured to receive and interpret a plurality of conditions 212 from each of the vendor layer 110, the delivery layer 120, and the consumer layer 130, while the planner 220 is configured to provide instructions 222 to each of the layers 110, 120, 130. The vending manager 200 may also coordinate with external sources, such as weather services, social media, and third-party location services to optimize the interaction between each of the layers 110, 120, 130.

The control layer 100 may further include a control center 108 configured to interact with the vending manager 200. The control center 108 may provide rules to one or both of the evaluator 210 and the planner 220 in order to bias or fix the instructions 222 provided to each of the layers 110, 120, 130.

The vendor layer 110 includes one or more service stations 20 configured to maintain an inventory of products P to be provided to the delivery layer 120. In some examples, the service stations 20 are food service stations 20, 20a, which prepare ready-to-eat food products P (e.g., pizzas) for provision to the delivery layer 120, and ultimately, the consumer layer 130. Additionally or alternatively, the products P may be individual ingredients to be provided to the delivery layer 120, whereby the delivery layer 120 includes a means for assembling the ingredients into ready-to-eat food products P. While food products P are discussed hereafter, the method and system described herein may be used for delivery of any products.

The delivery layer 120 includes at least one delivery vehicle 300 configured to distribute the food products P from the vendor layer 110 to the consumer layer 120. As described in greater detail, below, the delivery vehicle 300 may provide conditions 212 to the evaluator 210 of the vending manager 200 and receive responsive instructions 222 from the planner 220. Although the vending manager 200 is illustrated as a centralized device located on the control layer 100, in some examples the DVS environment 10 may include a network of vending managers 200, which intercommunicate with each other to coordinate the vendor layer 110 and the delivery layer 120. For example, each of the delivery vehicles 300 may include a vending manager 200, such that the delivery vehicles 300 communicate with each other directly to evaluate conditions 212 and determine instructions 222.

The consumer layer 130 includes at least one consumer 30 in communication with the delivery layer 120 via the distribution network 150. In some examples, the consumer 30 may be in communication with a user device 400. In some examples, the user device 400 is a mobile device 400, such as a smart phone or tablet. However, as discussed above, the user device 400 may be a stationary device, such as a personal computer, a smart television, a smart speaker, or other interactive devices. The user device 400 is in communication with the communication network 140, thereby placing the consumer 30 in communication with each of the control layer 100, the vendor layer 110, and the delivery layer 120. The user device 400 may include downloadable software, such as an application 410 (i.e., app) executable to provide an interface for communicating with each of the control layer 100, the vendor layer 110, and the delivery layer 120, as described in greater detail, below.

The consumer layer 130 may also include buildings 40 and other structures having vending areas for the delivery vehicles 300 to interact with the consumers 30. The buildings 40 may include media devices, such as televisions or computers which provide interfaces between the consumers 30 and at least one of the control layer 100, the vendor layer 110, and the delivery layer 120 via the communication network 140. For example, media devices within the buildings 40 may display current and/or schedule locations for the delivery vehicles 300, along with inventories of the delivery vehicles 300.

Figure 1B:
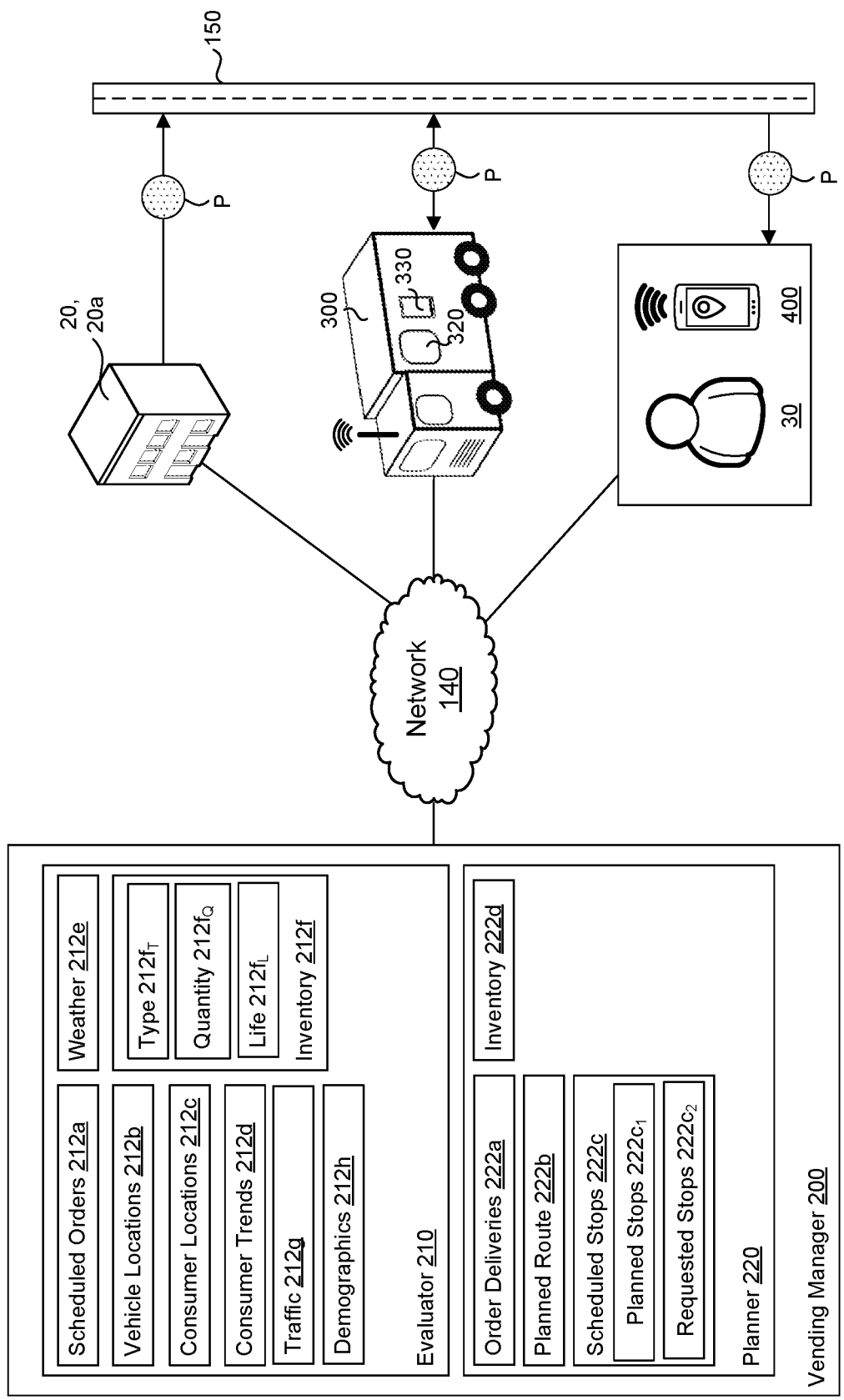
FIG. 1B is a schematic view of an example server of a dynamic vending system environment.

With reference to FIG. 1B, a more detailed example of the vending manager 200 is provided. As shown, the evaluator 210 of the vending manager 200 may receive one or more conditions 212 from each of the layers 110, 120, 130. Some examples of the conditions 212 include scheduled orders 212a, locations 212b of delivery vehicles within the distribution network 150, current locations 212c of consumers within the distribution network 150, historical and projected consumer purchasing trends 212d, current and forecasted weather conditions 212e, current and/or projected vehicle inventories 212f, current and projected traffic conditions 212g, and/or consumer demographics 212h of various geographical areas. Inventory conditions 212f may include inventory types $212f_T$ (e.g., sizes, ingredients), inventory quantities $212f_Q$ (e.g. total product quantity, product quantity for each type), and/or projected product life $212f_L$ (e.g. expiration, freshness)

Based on the conditions 212, the planner 220 determines and provides a plurality of instructions 222 to the delivery vehicles 300. For example, the planner 220 may schedule order deliveries 222a, plan routes 222b for each of the delivery vehicles 300, schedule vehicle stops 222c along the planned routes 222b, and/or determine inventories 222d for each of the delivery vehicles 300. The scheduled vehicle stops 222c may include planned stops $222c_1$, which are predetermined by the planner 220 independent of any specific transaction, and are based on maximizing a likelihood of sale of the products P at the stop location. Additionally or alternatively, the scheduled stops 222c may include requested stops $222c_2$, which can be added to the planned route 222b at any time. As discussed in greater detail below, the requested stops $222c_2$ may be associated with a specific transaction including the products P. In some examples, the requested stops $222c_2$ may be received from the user device 400 via direct communication and/or the network 140. In other examples, the consumer 30 may be able to physically prompt the planner 220 to add a requested stop $222c_2$ to the planned route 222b.

Generally, the vending manager 200 is configured to optimize routes 222b, stops 222c, and inventory 222d to maximize the number of consumers 30 reached, while minimizing a length and/or duration of the planned route 222b. Although the planner 220 may be configured to provide initial instances of each of the instructions 222 based on the conditions 212 received at a first point in time, the vending manager 200 may also dynamically adjust the instructions in real-time as the conditions 212 change. For example, the vending manager 200 may adjust delivery vehicle 300 routes 222b based on an interruption in traffic 212g or a shift in consumer locations 212c. In some examples, the planner 220 may dynamically update instructions 222 to a first delivery vehicle 300 to accommodate unexpected deviations by a second delivery vehicle 300, such as unscheduled stops and/or changes in product inventory.

In addition to maximizing the number of consumers 30 reached, the vending manager 200 may be configured to ensure that properties of the products P available for purchase satisfy thresholds related to product quality. For example, the products P included in the delivery vehicle 300 may be freshly-made products, which are desirably maintained within a desired temperature range, and have a predetermined serving life. Accordingly, the evaluator 210 may be provided with conditions relating to the expected product life $212f_L$, which are then evaluated to determine whether particular products P are suitable for purchase. For example, the evaluator 210 may be provided with predetermined expiration dates for the products P. Additionally or alternatively, the evaluator 210 may determine a projected expiration time for each of the products based on a duration, a temperature, or a combination thereof.

Based on the product life $212f_L$ the planner 220 may modify available inventory 222d. In some examples, once a product P is identified as not satisfying a threshold, such as exceeding desired age or falling below desired temperature, the planner 220 may make the product unavailable for purchase. Likewise, the planner 220 may limit availability of the product P to stops 222c or routes 222b that can be reached prior to a projected expiration time. For example, if one of the products is projected to expire within 15 minutes, the planner 220 may restrict availability of that product P to locations that can be reached within the 15 minutes. In some examples, the planner 220 may modify the planned route 222b and/or schedule stops 222c to maximize the likelihood of sale of products P based on expected expiration and/or availability. For example, where the planner 220 identifies products P that may expire within a predetermined time limit, the planner 220 may adjust the planned route 222b to include areas or planned stops $222c_1$ that are more likely to result in the sale of the expiring products P. Additionally or alternatively, where remaining inventory includes a particular type of the product P (e.g. size, ingredients), the planner 220 may modify the planned route 222b and/or scheduled stops 222c to maximize a likelihood of sale of the remaining inventory.

Figure 1C:
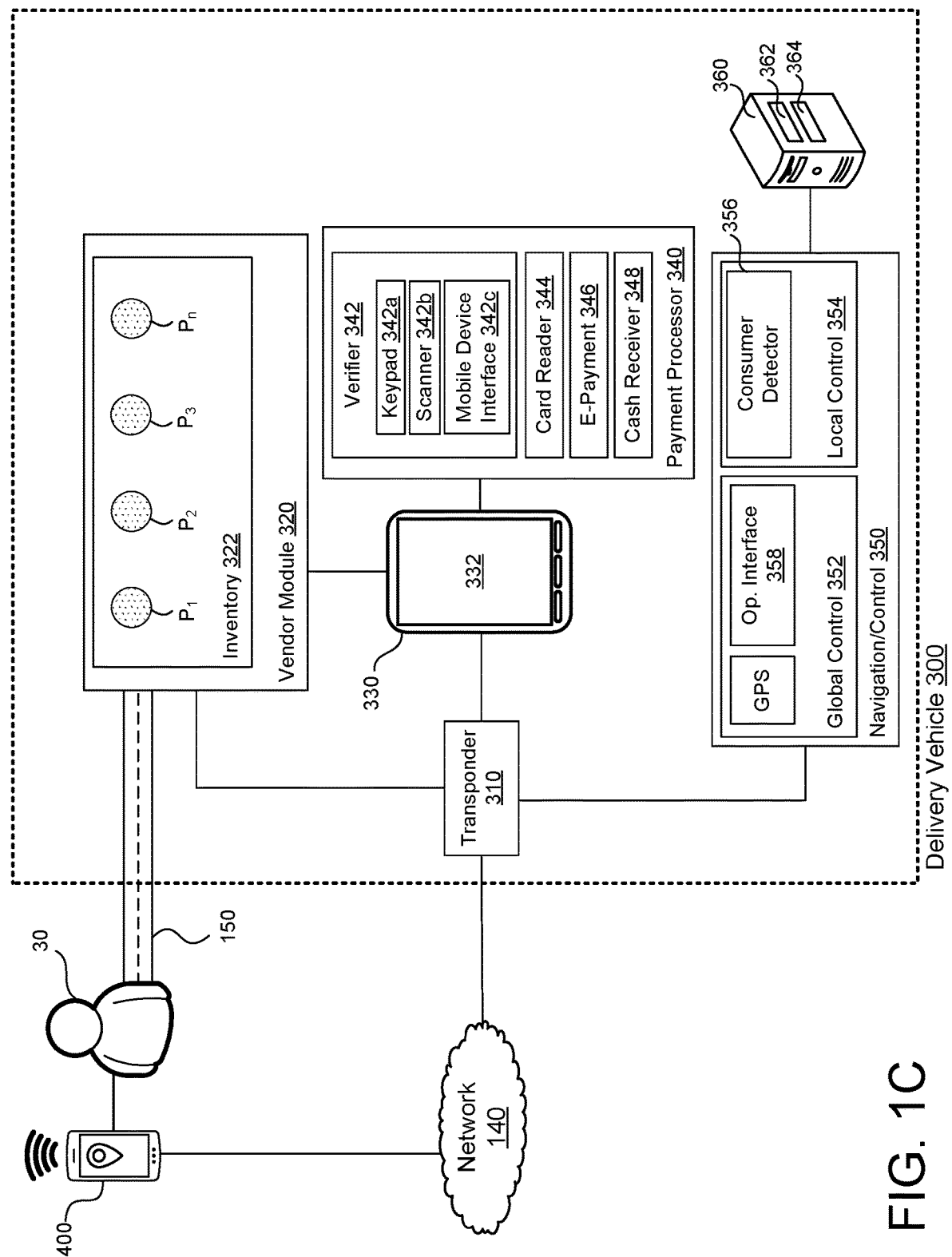
FIG. 1C is a schematic view of an example delivery vehicle of a dynamic vending system environment.

FIG. 1C shows a schematic view of an example of a delivery vehicle 300 configured according to the instant disclosure. The delivery vehicle 300 includes a transponder 310 configured to facilitate communication between the delivery vehicle 300 and the network 140. The delivery vehicle 300 further includes a vendor module 320 configured to maintain an inventory 322 of products $P_{1-n}$ for distribution to the consumers 30. As used herein, the term "inventory" includes one or more quantities of one or more types (e.g., size, ingredients) of the food products P. In some configurations, the delivery vehicle 300 may be a standard vehicle retrofitted to incorporate the vendor module 320. For example, a standard car or van may be fitted with the vendor module 320 so that the products P can be provided to the consumers 30 through a vehicle opening, such as a window, door, or hatch. The vendor module 320 may be configured as a dispenser, whereby a selected product P is retrieved from the inventory 322 and presented to the consumer 30 through the vehicle opening. Additionally or alternatively, the vendor module 320 may be compartmentalized, where the products P are enclosed within individual chambers which can be accessed by the consumers 30 to retrieve products P therefrom.

The delivery vehicle 300 may include a user interface 330 for allowing consumers 30 to interact directly with the delivery vehicle 300. The user interface 330 may include an interactive display 332 for showing various conditions of the delivery vehicle 300 and for allowing consumers 30 to interact with the delivery vehicle 300. For example, the user interface 330 may display the current inventory 322 of products P of the delivery vehicle 300, and provide an interface for executing a purchase of one or more of the products P. Additionally or alternatively, the user interface 330 may be provided or mirrored to the remote user device 400.

The delivery vehicle 300 further includes a payment processor 340 configured to receive payments from the consumer 30. The payment processor 340 may include a verifier 342 configured to allow the consumer 30 to provide an order confirmation to the delivery vehicle 300 to authenticate prior payment for purchase of one of the products PP. In some examples, the verifier 342 may include a keypad 342a configured to allow the consumer 30 to manually enter an authentication code 416 corresponding to a particular product or products P. Additionally or alternatively, the verifier 342 may be incorporated with a scanner 342b configured to read a unique identifier 418, as discussed in greater detail below.

In some examples, the verifier 342 may include a user device interface 342c configured to communicate with the user device 400 to verify prior purchase of one of the products P. For example, the verifier 342 may automatically connect with the user device 400 when the user device 400 is within a predetermined proximity to the verifier 342. In some examples, the verifier 342 may communicate directly with the user device 400 using one or more wireless communication protocols, such as low-energy Bluetooth (BLE), Wi-Fi direct, or the like. Alternatively, the verifier 342 may locate and communicate with the user device 400 indirectly using one or more communications networks and a global positioning system of the user device 400. Once the consumer 30 is near the delivery vehicle 300, the user device 400 may be used to request a corresponding product P to be dispensed.

The payment processor 340 may also include local payment processing systems, such as a payment card reader 344, an e-payment portal 346 (e.g., Paypal™, Venmo™, etc.), and/or a cash receiver 348 for providing payment at the delivery vehicle 300. The payment processor 340 may be integrated with the user interface 330.

With continued reference to FIG. 1C, the delivery vehicle 300 further includes a navigation and control unit 350. Generally, the navigation and control unit 350 is configured to manage movement of the delivery vehicle 300 within the distribution network 150 based on both global control 352 and local control 354. For example, the global control 352 may include the planned route 222b and the scheduled stops 222c within the distribution network 150, which are provided to the delivery vehicle 300 by the planner 220. The global control 352 may be considered macro level navigation, whereby the global position of the delivery vehicle 300 is managed. As discussed above, the global control 352 may be dynamically updated based on the conditions 212 provided to the evaluator 210. Alternatively, the global control 352 and position of the vehicle may be a predetermined route, where the delivery vehicle 300 is in a roaming mode and the predetermined route is maintained, regardless of the conditions 212.

In some examples, the navigation and control unit 350 receives and executes instructions 222 autonomously, whereby the delivery vehicle 300 is equipped with systems for navigating autonomously. Alternatively, the instructions 222 may be provided to a delivery vehicle operator in real-time via one or more operator interfaces 358 within the delivery vehicle 300, whereby the instructions 222 are manually executed by the vehicle operator.

The local control 354 is configured to provide micro level navigation and control of the delivery vehicle 300, whereby conditions not available to the global control 352 are identified and evaluated to provide more precise control of the delivery vehicle 300. The local control 354 includes known means for identifying and evaluating local factors. In some examples, the local control 354 includes a consumer detector 356 configured to identify potential consumers 30 near the vehicle 300.

The consumer detector 356 allows consumers 30 located near the delivery vehicle 300 to hail the vehicle. Upon identification of an interested consumer 30, the local control 354 may identify a safe stopping location, so that the consumer 30 may approach the delivery vehicle to complete a transaction via the user interface 330 and payment processor 340. The consumer detector 356 and user interface 330 advantageously allow consumers 30 to interact with the delivery vehicle 300 directly to complete transactions without the need for advanced ordering via the user device 400.

In some examples, the consumer detector 356 is configured to communicate directly or indirectly with the user device(s) 400 of one or more of the consumers 30 to determine proximity of the one or more consumers 30. For example, the application 410 executed by the user device 400 allows the user device 400 to communicate with the navigation and control unit 350. Communication between the user device 400 and the consumer detector 356 may be indirectly provided via the one or more communications networks 140. Additionally or alternatively, the user device 400 of the user 30 may be configured to communicate directly with the consumer detector 356 when the consumer is within a within a predetermined distance from the delivery vehicle 300. When one or both of the user device 400 and the delivery vehicle 300 determines that the other of the user device 400 and the delivery vehicle 300 is within a threshold distance of the other, a prompt may be provided to the user 30 indicating the presence of the vehicle 300. In some examples, the prompt may be actively provided to the user via a push notification through the user device 400. In some examples, the prompt may be passive, whereby the consumer 30 can view the vehicle 300 location via a map provided to the user device 400. Alternatively, the vehicle 300 itself may provide an audible or visual prompt to nearby consumers. The consumer 30 may then "hail" the delivery vehicle 300, either by physical gesture or via the user device 400. For example, the consumer detector 356 may be configured to recognize a wave of a hand. Additionally or alternatively, the consumer 30 may request a stop via the user device 400.

Figure 1D:
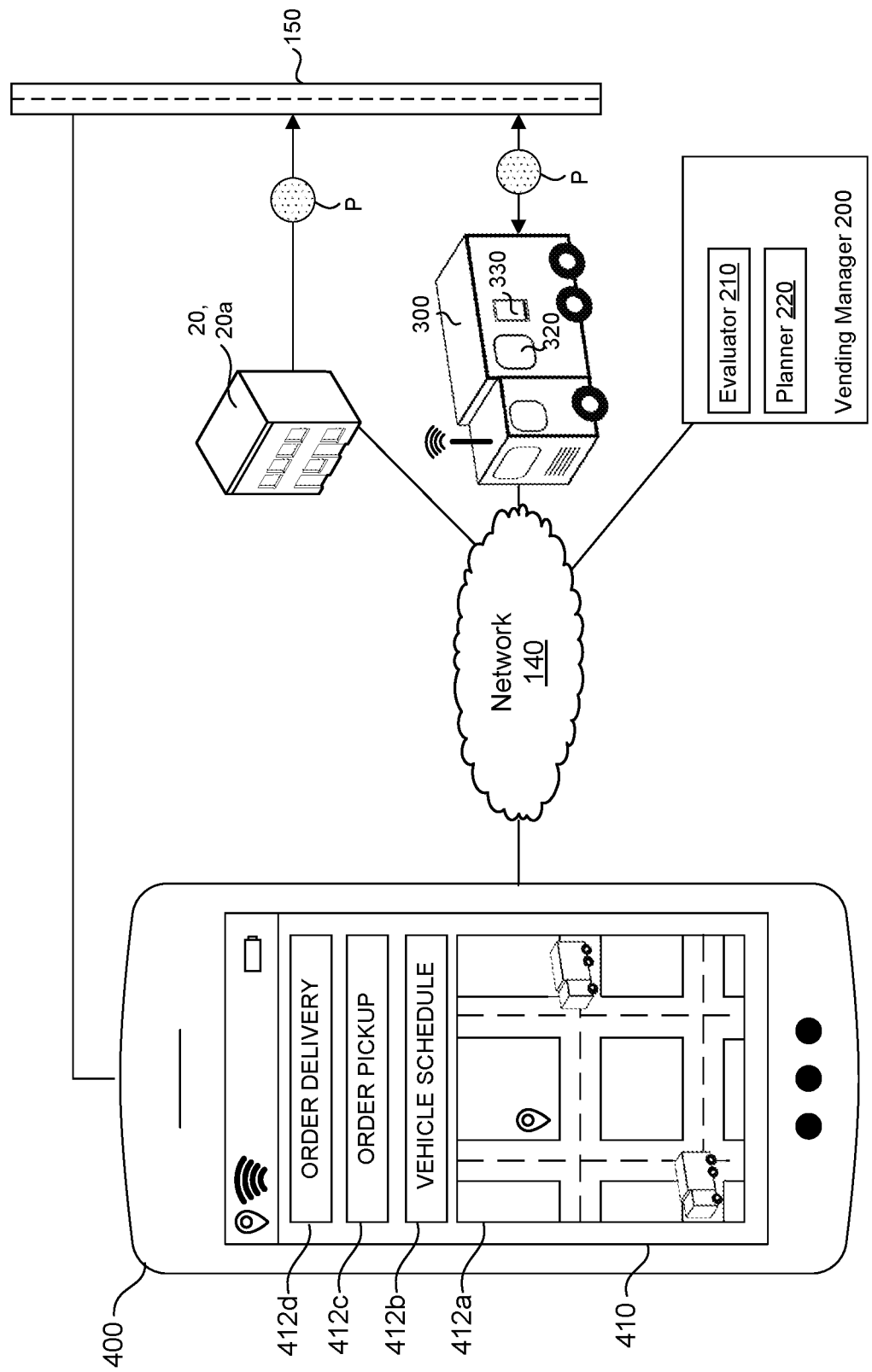
FIG. 1D is a schematic view of an example user device of a dynamic vending system environment.

Each of the transponder 310, the vendor module 320, the user interface 330, the payment processor 340, and the navigation and control unit 350 may be configured to run on a vehicle server 360 including data processing hardware 362 and memory hardware 364. As provided above, the vehicle server 360 may further include a local vending manager (not shown) including a local evaluator and a local planner. The local vending manager may interact with local vending managers of other delivery vehicles 300 to coordinate respective operating strategies for the delivery vehicles 300. With reference to FIG. 1D, one implementation of the application 410 of the user device 400 is shown. The application 410 may display of plurality of user-selectable areas, or buttons 412, each corresponding with a function of the application 410, as described in FIGS. 2A-3G below. Additionally or alternatively, a similar example of the application 410 may be executed on the user interface 330 of the delivery vehicle 300, as shown in FIGS. 4A and 4B.

As discussed above, the delivery vehicle 300 may initially be provided with an inventory 322 of products P available for sale based on a determination by the vending manager 200. The vending manager 200 may then provide a planned route 222b and scheduled stops 222c to the delivery vehicle 300. The planned route 222b may correspond to a particular neighborhood or area. The scheduled stops 222c may correspond with locations which are likely to result in transactions, such as areas having large population concentrations or areas that are associated with the product P, like food truck areas or city streets. Accordingly, in what may be referred to as a "roaming mode", the delivery vehicle 300 is configured to execute the planned route 222b without having predetermined orders. Here, the planned route 222b may be geographically-based, where the vending manager 200 instructs the delivery vehicle 300 to canvas a particular area by without consideration of conditions 212. For example, the vending manage 200 may instruct the delivery vehicle 300 to proceed along all streets within a predetermined area. The planned route 222b may be dynamically adjusted based on the conditions 212 provided to the evaluator 210. Furthermore, the planned route 222b may be adjusted to accommodate requested stops $222c_2$, such as consumer 30 requests and/or orders, as described in FIGS. 2A-4B.

The planned route 222b and the scheduled stops 222c may be displayed to a consumer 30 via the user device 400. For example, the application 410 may be configured to display an interactive map 412a showing a location of various delivery vehicles 300 with respect to a location of the consumer 30. The consumer 30 may select delivery vehicles 300 from the interactive map 412a to display associated vehicle profiles, as discussed below with respect to FIGS. 2B and 2C. Additionally or alternatively, the application 410 may include user selectable vehicle schedule 412b, which displays a list of scheduled stops 222c for all delivery vehicles 300 within a defined distance from a current location of the consumer 30 or a defined location, such as a zip code or street address. The application 410 may also include buttons 412c, 412d for initiating orders from the delivery vehicles 300 and/or the service stations 20.

Figure 2B:
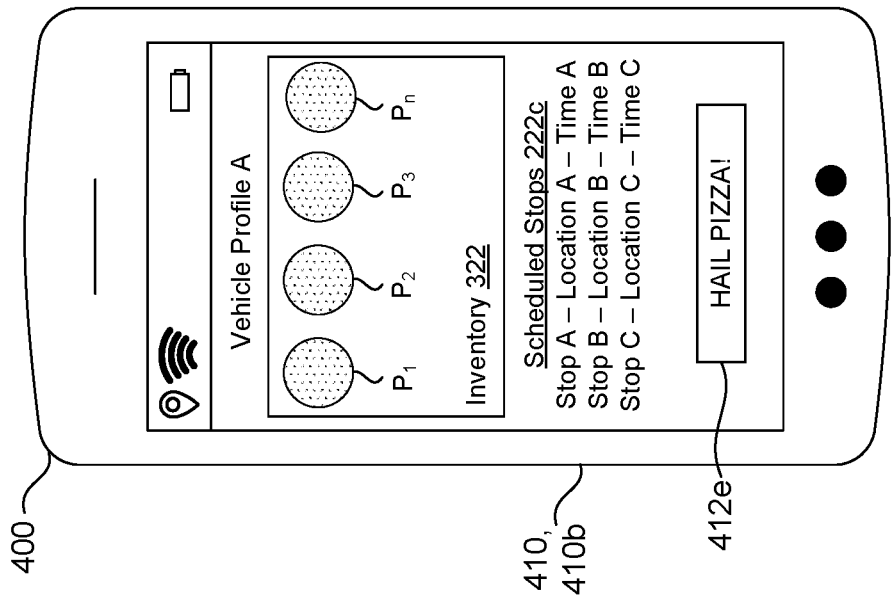
Figure 2A:
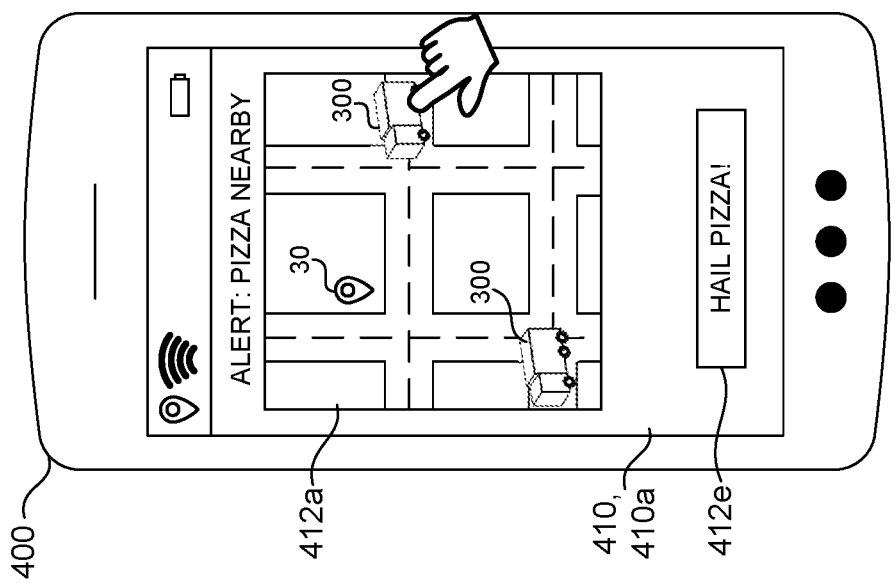

With reference to FIGS. 2A-2G, a first implementation of the DVS environment 10 is illustrated. During roaming mode of the delivery vehicle 300, the application 410 may be configured to push a notification screen 410a to consumers 30 when one or more of the delivery vehicles 300 is nearby, as shown in FIG. 2A. The consumer 30 may configure notification settings, so that notifications are provided based on user preferences, such as times of day, vehicle locations, and/or vehicle inventories (e.g. product quantities and/or product types). For example, the consumer 30 may set the application 410 to display the notification screen 410a when a delivery vehicle carrying a first product $P_1$ is within a five mile radius of the user between 12:00 PM and 1:00 PM. Additionally or alternatively, the application 410 may provide a secondary prompt, such as a tone, an icon, or a vibration to alert the consumer 30 of the presence of a delivery vehicle 300.

The notification screen 410a may include the interactive map 412a along with a user-selectable hail button 412e. As shown in FIG. 2A, the consumer 30 may select one of the delivery vehicles 300 from the interactive map 412a, as indicated by the hand icon. The selection of the delivery vehicle 300 opens a vehicle profile screen 410b, as shown in FIG. 2B. The vehicle profile screen 410b may include information relating to the inventory 322 of the selected delivery vehicle 300 and the scheduled stops 222c of the selected delivery vehicle 300. Additionally, the vehicle profile screen 410b may include the hail button 412e. Selection of the hail button 412e from within the vehicle profile screen 410b prompts the vending manager 200 to add the current location of the consumer 30 to a queue of the schedule stops 222c for the selected delivery vehicle 300. The queue of the scheduled stops 222c may be prioritized by the vending manager 200 based on a sequence that the request was received, by a distance from the delivery vehicle 300 to the consumer, or by other prioritization factors.

Figure 2D:
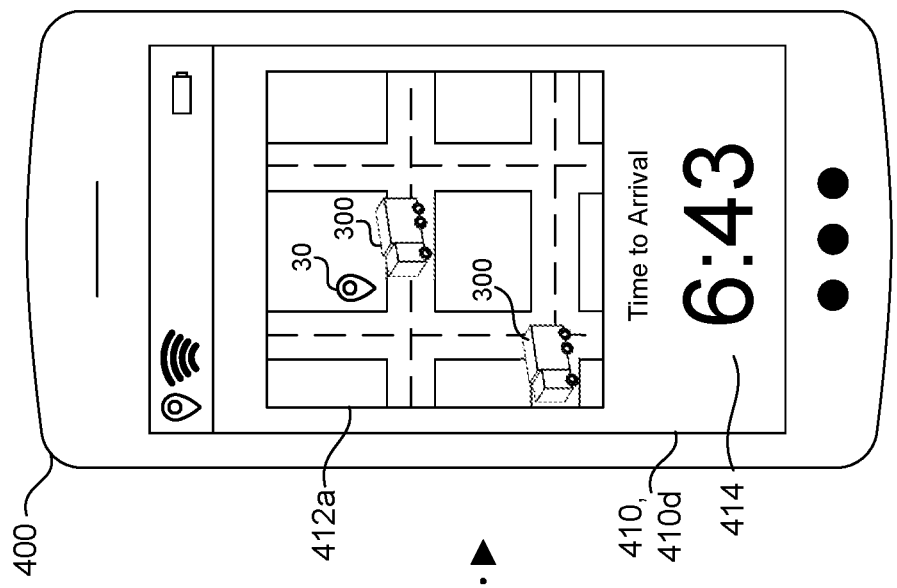
Figure 2C:
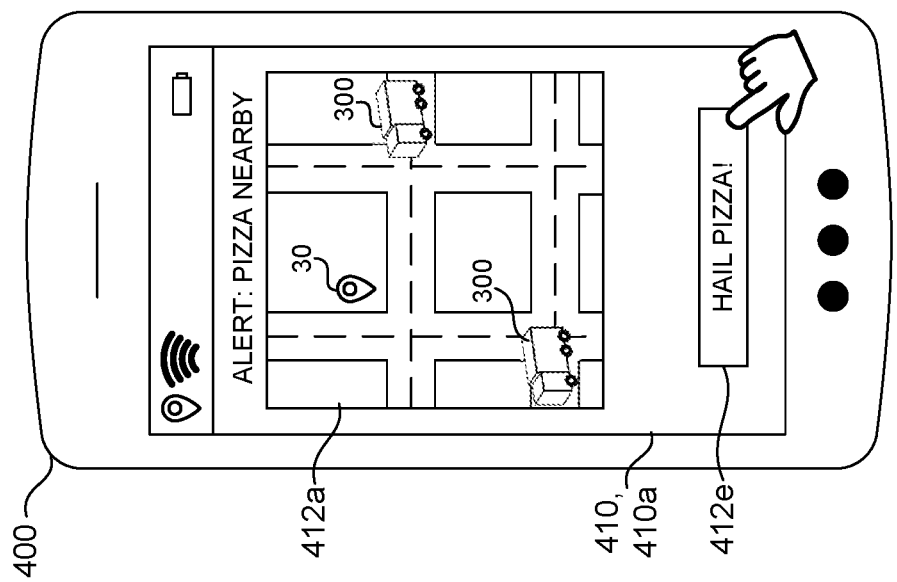

With reference to FIG. 2C, the notification screen 410a is again shown. In this instance, the consumer 30 has selected the hail button 412e from within the notification screen 410a, as indicated by the hand icon. As opposed to the selection of the hail button 412e from within a specific vehicle profile screen 410b, the selection of the hail button 412e from within the notification screen 410a may send a request to the vending manager 200 to hail the nearest delivery vehicle 300, or the delivery vehicle with the shortest queue of scheduled stops 222c.

Upon selection of the hail button 412e from within the notification screen 410a or the vehicle profile screen 410b, the application 410 may provide a tracking screen 410d, which shows the current location of the delivery vehicle 300 on the interactive map 412a, along with an estimated time of arrival 414, as shown in FIG. 2D.

With reference to FIG. 2E, the consumer 30 may be provided with an order screen 410e relating to the hailed delivery vehicle 300. The order screen 410d facilitates the purchase of one or more of the products $P_{1-n}$ maintained within the inventory 322 of the delivery vehicle 300. Upon completion of the order, the application 410 may display an order confirmation screen 410f including an authentication code 416 and/or a unique identifier 418, as shown in FIG. 2F.

Figure 2G:
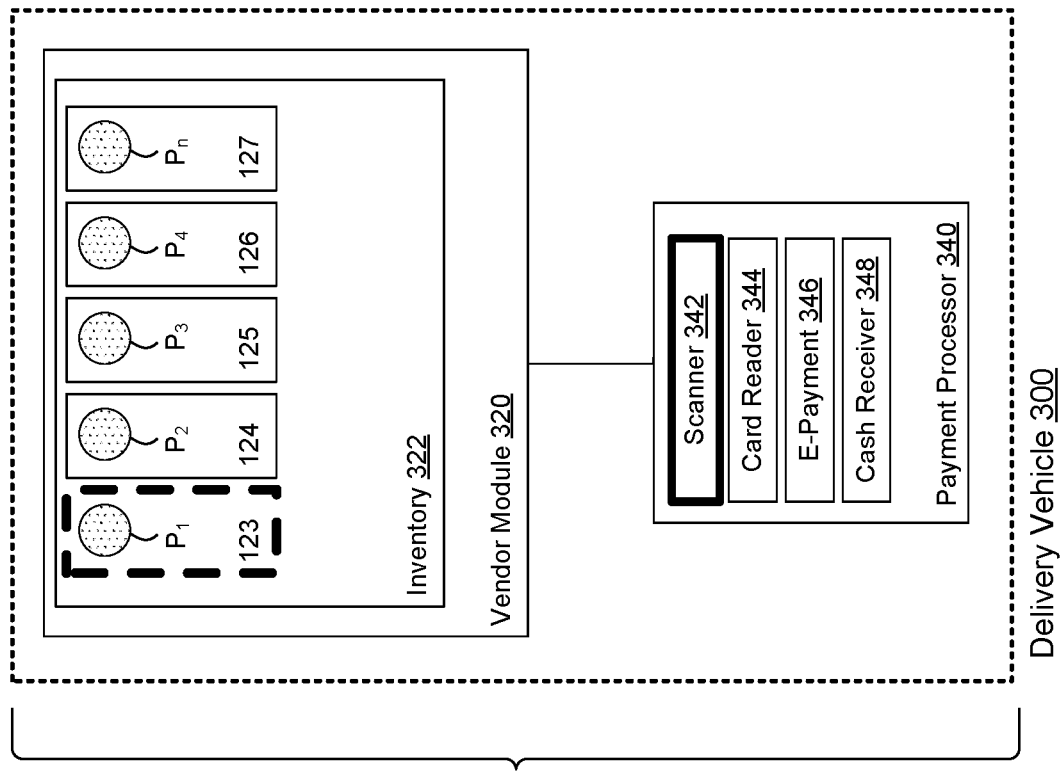
Figure 2G:
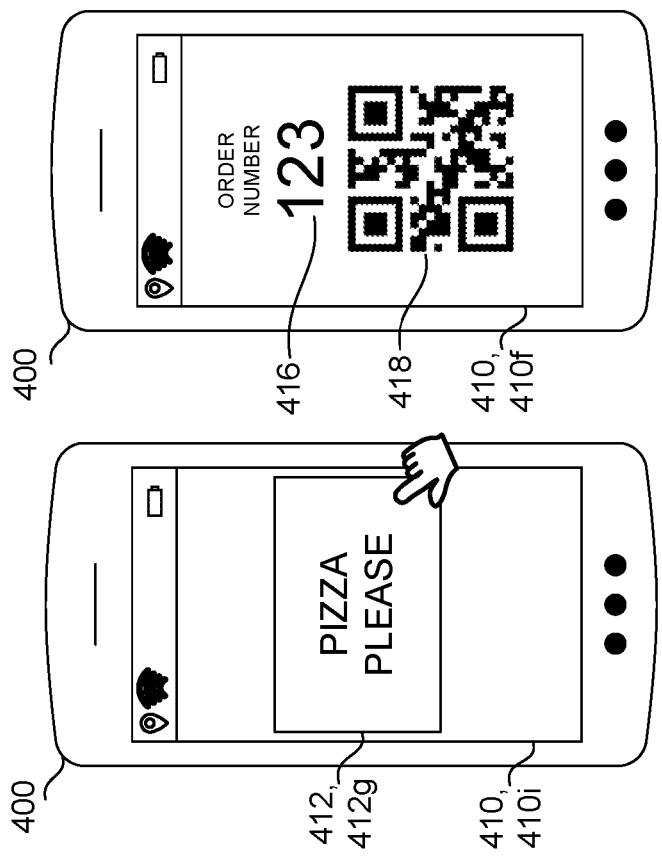

When the delivery vehicle 300 arrives at the location of the consumer 30, the consumer 30 may present the authentication code 416 or the unique identifier 418 to the verifier 342, which then prompts the vendor module 320 to dispense the corresponding product $P_1$ to the consumer 30, as indicated by the bold, dashed line in FIG. 2G. Alternatively, the user device 400 may wirelessly communicate with the vendor module 320 such that the consumer 30 may use the user device 400 to actively or passively prompt the vendor module 320 to dispense the corresponding products $P_1$. For example, the user device 400 may be in direct or indirect communication with the vendor module 320, whereby the consumer 30 may actively prompt the vendor module 320 to dispense the products P₁ by pressing a dispensing button 412g within the application 410.

Additionally or alternatively, the vendor module 320 may recognize when the user device 400 is within a predetermined proximity to the delivery vehicle 300, whereby the vendor module 320 is then placed into a dispense mode to allow the consumer 30 to request dispensing of the product P via the application 410 or via the user interface 330 of the delivery vehicle 300.

Upon completion of the "hailed" stop, the delivery vehicle 300 may return to roaming mode along the planned route 222b. The planned route 222b may be updated by the vending manager 200 based on changes in the conditions 212 during the stop.

Figures 3A, 3B:
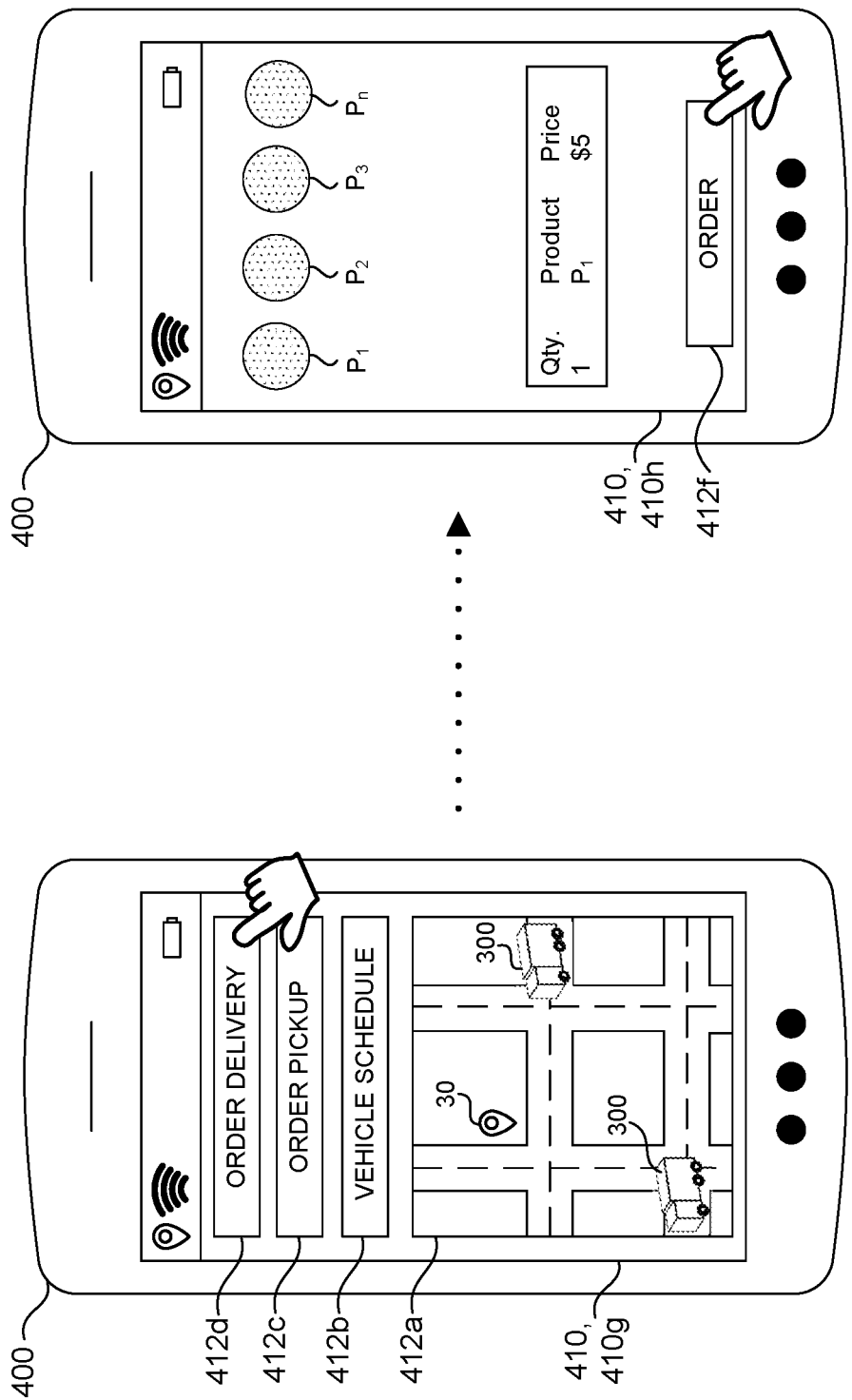
FIGS. 3A-3G are schematic views of an example of an implementation of a dynamic vending system environment.

Referring now to FIGS. 3A-3D, a second example of an implementation of the DVS environment 10 is shown. In FIG. 3A, the application 410 of the user device 400 is shown in a home screen 410g, which includes the interactive map 412a, the vehicle schedule button 412b, the order pickup button 412c, and the order delivery button 412d. In this implementation, the consumer 30 has selected the order delivery button 412d to request a delivery of the products P where the delivery vehicles 300 are not currently nearby and are not scheduled to be nearby within a predetermined period of time. The application 410 then provides an order delivery screen 410h, where the consumer 30 can select a desired product P to be delivered. Upon selection of the desired product P, the consumer 30 may complete the transaction by selecting the order button 412f. Unlike the example of the order screen 410d shown in FIG. 2E, which places an order based on a selected delivery vehicle inventory 322, the order screen 410f of the second example may allow the consumer to select a product from an inventory 322 of all delivery vehicles 300 within a defined distance. Additionally or alternatively, the order screen 410f may display inventories of nearby service stations 20, which could be provided to one of the delivery vehicles 300 for delivery to the consumer 30.

Figure 3D:
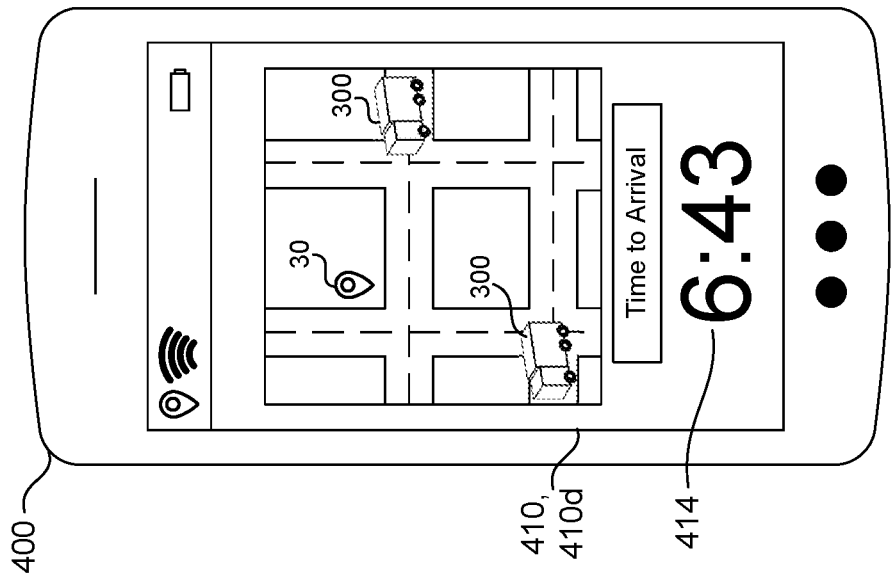
Figure 3C:
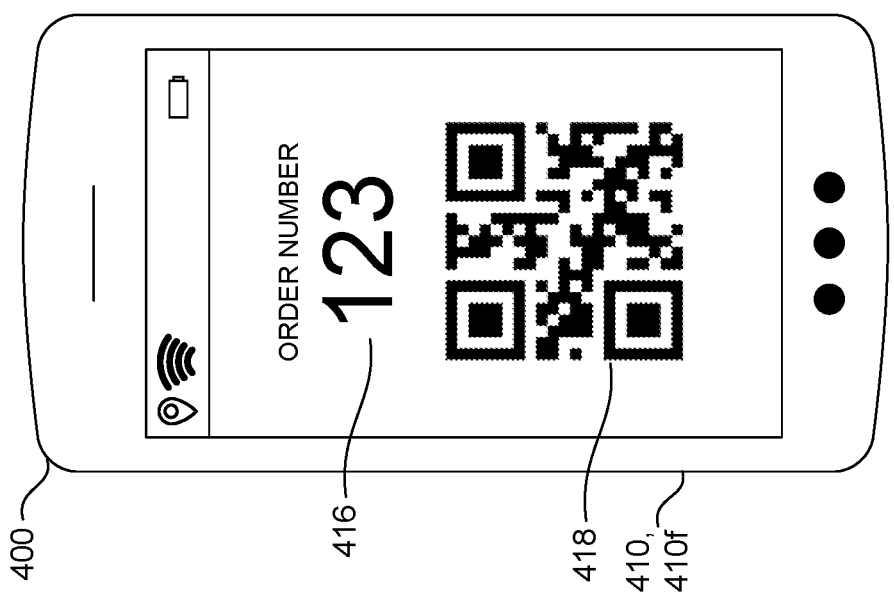
Figure 3F:
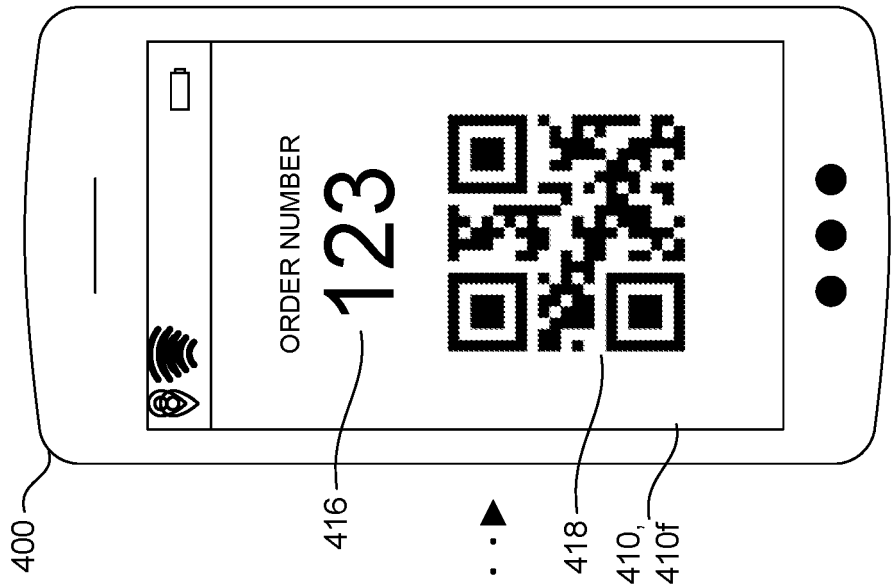
Figure 3E:
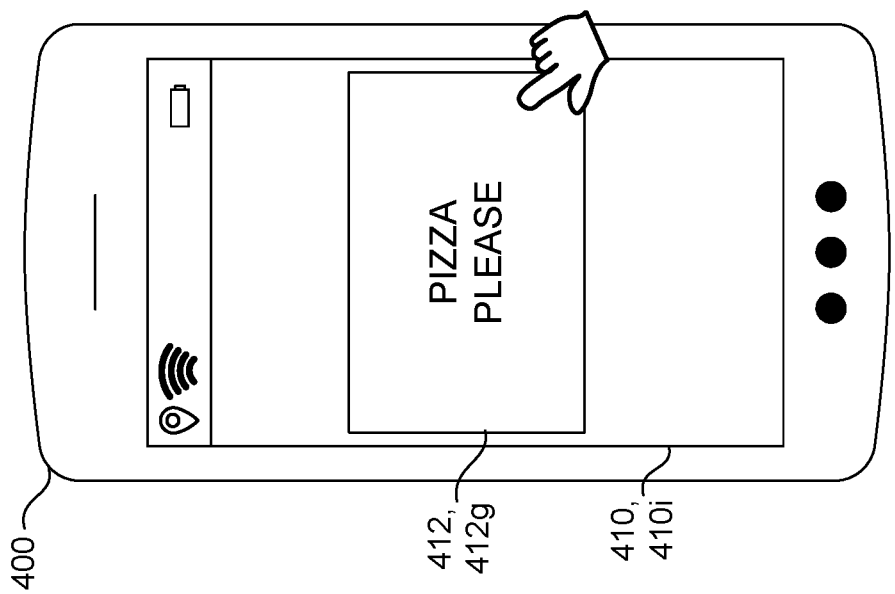
Figure 3G:
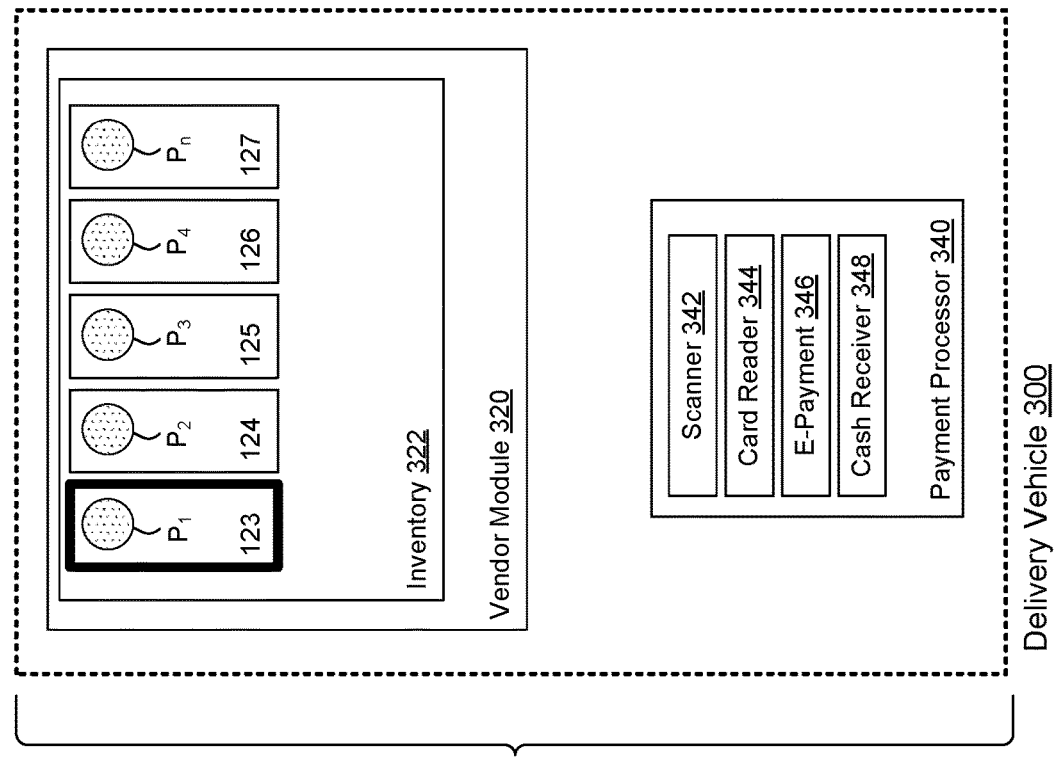
Figure 3G:
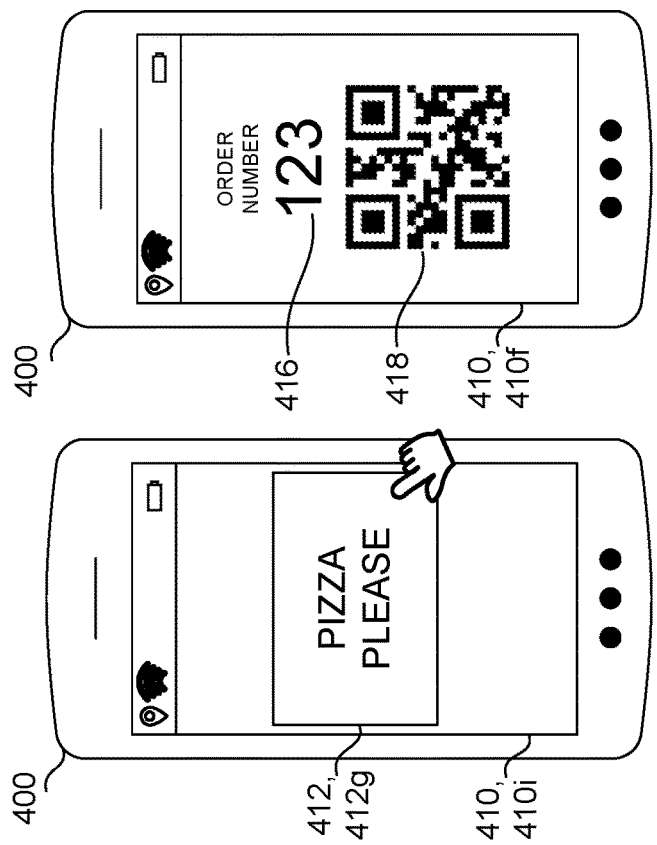
Figure 4A:
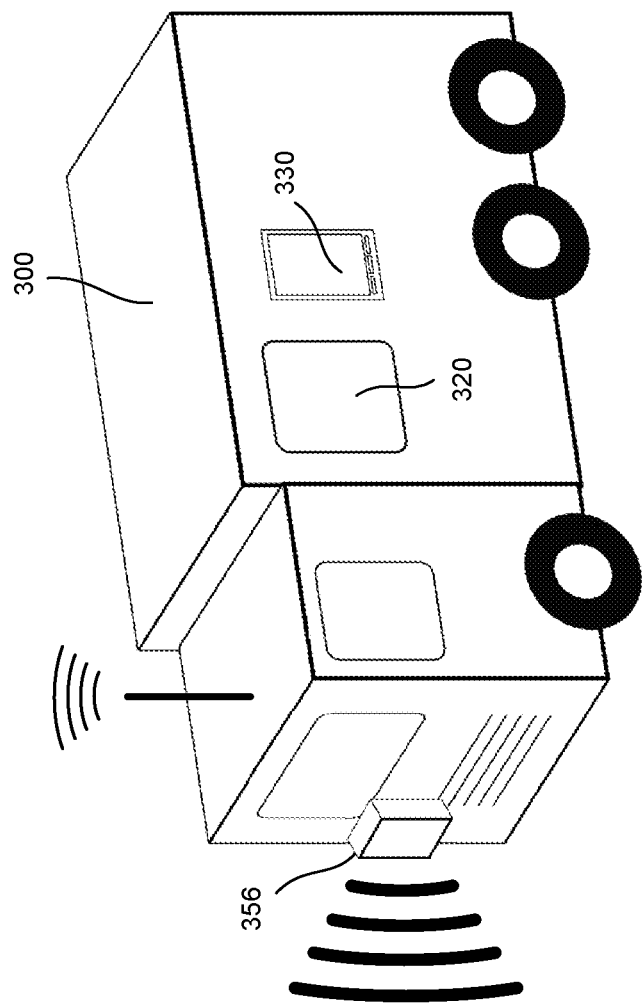
FIGS. 4A-4B are schematic views of an example of an implementation of a dynamic vending system environment.
Figure 4A:
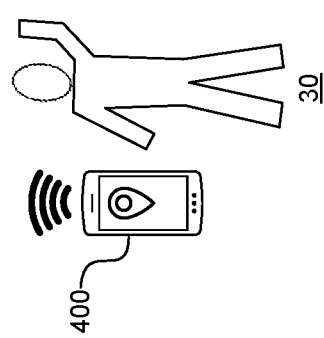
Figure 4B:
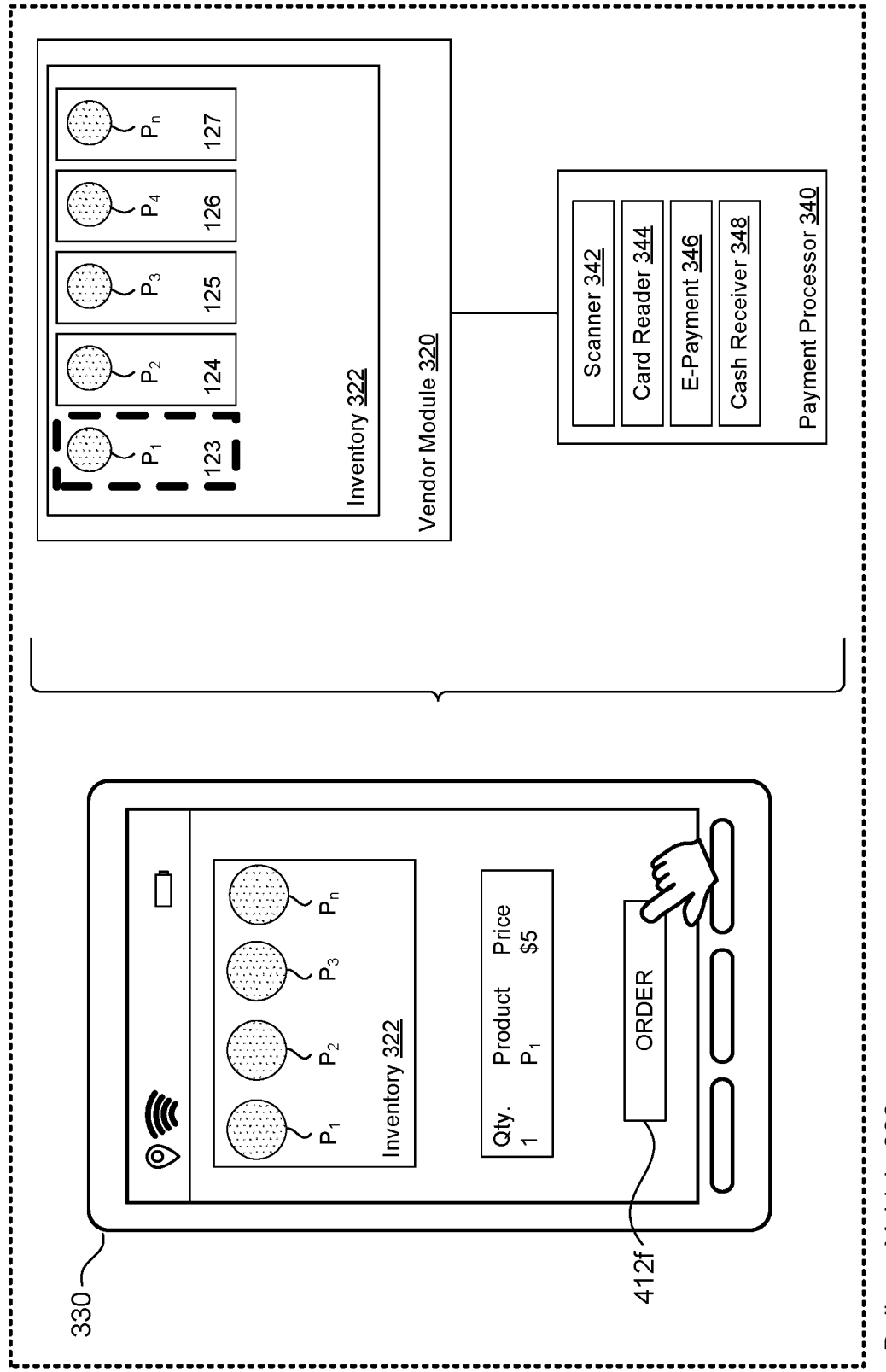

Once the order is completed, the application 410 may display order confirmation screen 410f, as shown in FIG. 3C, and the tracking screen 410d, shown in FIG. 3D. When the delivery vehicle 300 arrives at the location of the consumer 30, the consumer 30 may be presented with an arrival screen 410i which displays a dispensing button 412g, as shown in FIG. 3E. As shown, the consumer 30 may select the dispensing button 412g to prompt the delivery vehicle 300 to dispense the corresponding order Alternatively, the consumer 30 may present the confirmation screen 410f including the unique identifier 418 to the scanner of the verifier 342 to dispense the corresponding product P.

Referring to FIG. 4A, a third implementation of the DVS environment 10 is shown. In the third implementation, the consumer 30 signals the delivery vehicle 300 manually by gesture, such as a wave of the hand. As discussed above, the delivery vehicle 300 may include consumer detector 356, which identifies the consumer gesture and initiates a delivery vehicle 300 stop. Once the delivery vehicle 300 identifies the consumer 30, the delivery vehicle safely approaches an area near the consumer 30, and the consumer 30 may approach the user interface 330 of the delivery vehicle 300 to initiate a transaction, as illustrated in FIG. 4B. Accordingly, the consumer 30 may purchase one of the products P from within the delivery vehicle 300 by interacting directly with the user interface 330, without the need for the user device 400.

The disclosed system and methods of implementing the system advantageously provide a dynamic point of sale, which can be targeted towards specific consumers or groups of consumers in real-time based on one or more conditions. As opposed to known delivery vehicles, which are configured to deliver already-purchased products to fixed locations, the disclosed environment 10 is configured to adjust delivery vehicle behavior to maximize a number of transactions by allowing transactions to be carried out directly between the consumer 30 and the delivery vehicle 300.

Figure 5:
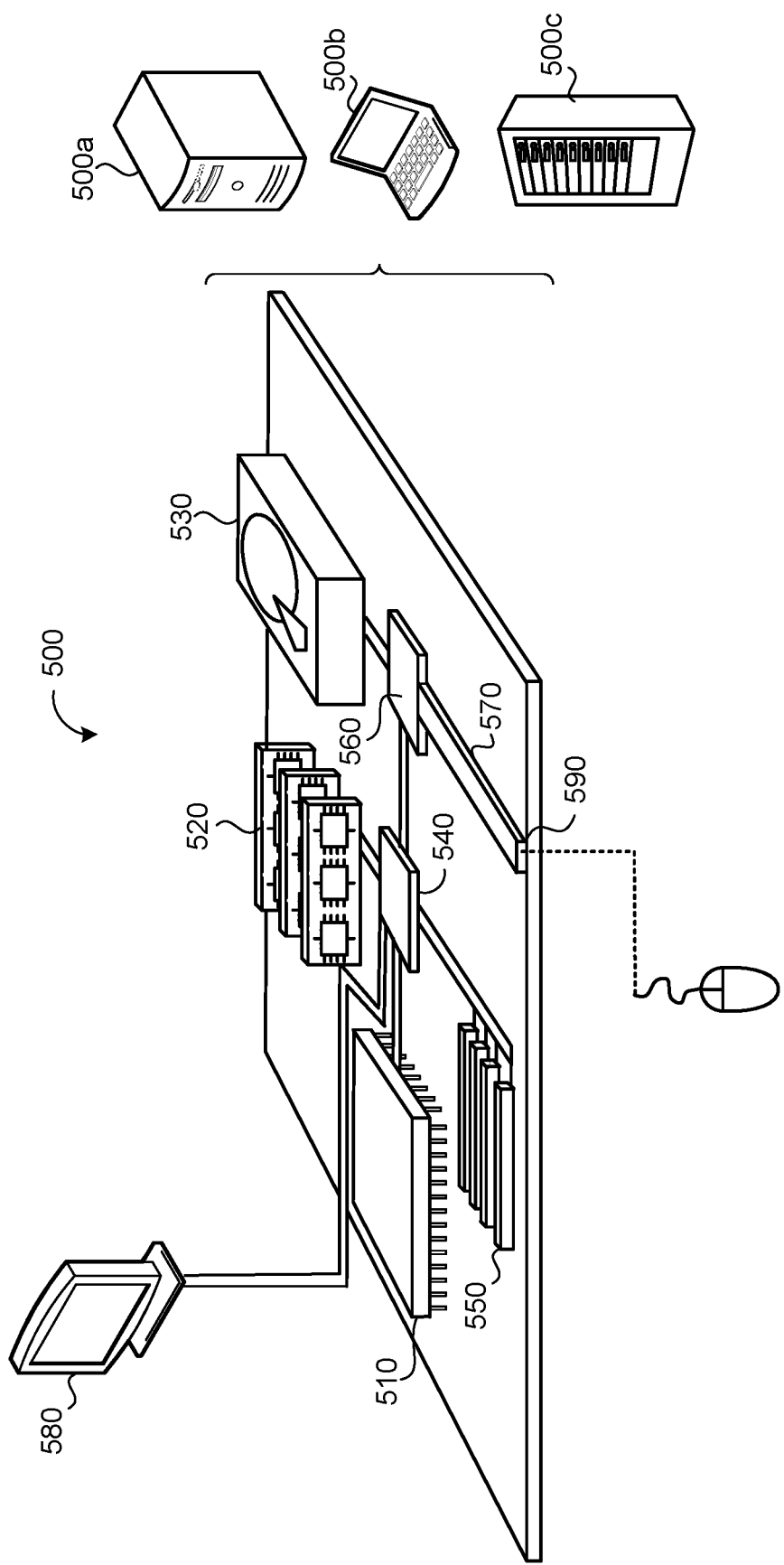
FIG. 5 is schematic view of an example computing device configured to implement a dynamic vending system environment.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   from a total inventory of products at a vehicle, determining one or more products available for sale based on a projected product life of individual products of the total inventory of products;
   executing a transaction associated with at least one of the one or more products available for sale;
   confirming an identity of a user based on an identifier associated with the transaction;
   verifying receipt of payment from the user associated with the transaction; and
   based on verifying receipt of payment and based on determining presence of the user at the vehicle, dispensing the one or more products associated with the transaction from the vehicle.

2. The method of claim 1, further comprising determining instructions for a first planned route for the vehicle, the determined instructions for the first planned route including instructions for the vehicle to stop at a first location, the transaction associated with the first location.

3. The method of claim 2, wherein the first planned route comprises a plurality of locations for the vehicle to stop, each location of the plurality of locations determined based on maximizing a likelihood of sale of the one or more products available for sale along the first planned route.

4. The method of claim 3, further comprising evaluating the likelihood of sale of the one or more products available for sale along the first planned route based on one or more conditions associated with the likelihood of sale, the one or more conditions associated with the likelihood of sale including at least one selected from the group consisting of (i) scheduled orders, (ii) delivery vehicle locations, (iii) consumer locations, (iv) consumer trends, (v) weather, (vi) product inventory quantities, (vii) product inventory types, (viii) product life, (ix) traffic, and (x) consumer demographics.

5. The method of claim 2, further comprising, based on receiving a request for the vehicle to stop at a second location different from the first location, determining instructions for a second planned route for the vehicle, the determined instructions for the second planned route including instructions for the vehicle to stop at the first location and the second location.

6. The method of claim 1, wherein verifying receipt of payment comprises generating the identifier associated with the transaction, presence of the user at the vehicle determined based on receiving the identifier at the vehicle.

7. The method of claim 1, wherein presence of the user at the vehicle is determined based on proximity of a user device associated with the user relative to the vehicle.

8. The method of claim 1, wherein the one or more products available for sale comprise food products.

9. A system comprising:
data processing hardware; and
memory hardware in communication with the data processing hardware, the memory hardware storing instructions that when executed on the data processing hardware cause the data processing hardware to perform operations comprising:
from a total inventory of products at a vehicle, determining one or more products available for sale based on a projected product life of individual products of the total inventory of products;
executing a transaction associated with at least one of the one or more products available for sale;
confirming an identity of a user based on an identifier associated with the transaction,
verifying receipt of payment from the user associated with the transaction; and
based on verifying receipt of payment and based on determining presence of the user at the vehicle, dispensing the one or more products associated with the transaction from the vehicle.

10. The system of claim 9, further comprising determining instructions for a first planned route for the vehicle, the determined instructions for the first planned route including instructions for the vehicle to stop at a first location, the transaction associated with the first location.

11. The system of claim 10, wherein the first planned route comprises a plurality of locations for the vehicle to stop, each location of the plurality of locations determined based on maximizing a likelihood of sale of the one or more products available for sale along the first planned route.

12. The system of claim 11, further comprising evaluating the likelihood of sale of the one or more products available for sale along the first planned route based on one or more conditions associated with the likelihood of sale, the one or more conditions associated with the likelihood of sale including at least one selected from the group consisting of (i) scheduled orders, (ii) delivery vehicle locations, (iii) consumer locations, (iv) consumer trends, (v) weather, (vi) product inventory quantities, (vii) product inventory types, (viii) product life, (ix) traffic, and (x) consumer demographics.

13. The system of claim 10, further comprising, based on receiving a request for the vehicle to stop at a second location different from the first location, determining instructions for a second planned route for the vehicle, the determined instructions for the second planned route including instructions for the vehicle to stop at the first location and the second location.

14. The system of claim 9, wherein verifying receipt of payment comprises generating the identifier associated with the transaction, presence of the user at the vehicle determined based on receiving the identifier at the vehicle.

15. The system of claim 9, wherein presence of the user at the vehicle is determined based on proximity of a user device associated with the user relative to the vehicle.

16. The system of claim 9, wherein the one or more products available for sale comprise food products.

* * * * *